(12) United States Patent
Cao et al.

(10) Patent No.: US 11,338,504 B2
(45) Date of Patent: May 24, 2022

(54) ONLINE LASER LEVELING DETECTION METHOD OF 3D PRINTER

(71) Applicant: Wenzhou University, Wenzhou (CN)

(72) Inventors: Yu Cao, Wenzhou (CN); Jialun Yang, Wenzhou (CN); Dehua Zhu, Wenzhou (CN); Wenwen Liu, Wenzhou (CN); Diqiang Xue, Wenzhou (CN); Xu Ji, Wenzhou (CN)

(73) Assignee: WENZHOU UNIVERSITY, Wenzhou (CN)

( * ) Notice: Subject to any disclaimer, the term of this patent is extended or adjusted under 35 U.S.C. 154(b) by 112 days.

(21) Appl. No.: 17/060,023

(22) Filed: Sep. 30, 2020

(65) Prior Publication Data
US 2021/0146601 A1  May 20, 2021

(30) Foreign Application Priority Data
Nov. 18, 2019  (CN) .......................... 201911130463.9

(51) Int. Cl.
*B29C 64/118*  (2017.01)
*B29C 64/393*  (2017.01)
(Continued)

(52) U.S. Cl.
CPC ........ *B29C 64/118* (2017.08); *B23K 26/0643* (2013.01); *B23K 26/0652* (2013.01);
(Continued)

(58) Field of Classification Search
CPC ... B29C 64/118; B29C 64/209; B29C 64/232; B29C 64/236; B29C 64/386;
(Continued)

(56) References Cited

U.S. PATENT DOCUMENTS 5,637,175 A * 6/1997 Feygin .................. B29C 64/141
 264/405
6,278,681 B1 * 8/2001 Nagano ............. G11B 11/10543
(Continued)

FOREIGN PATENT DOCUMENTS

CN   204936231 U  *  1/2016
CN   108943726 A  * 12/2018 ............. B29C 64/20

*Primary Examiner* — Atul P. Khare
(74) *Attorney, Agent, or Firm* — Mintz Levin Cohn Ferris Glovsky and Popeo, P.C.

(57) ABSTRACT

The present invention provides an online laser leveling detection method of a 3D printer. The method comprises: (1), arranging a bar-shaped triangular reflecting prism and a bar-shaped photoelectric receiver; (2), fixedly mounting a laser emitter and a plane mirror on the side face of a printer head; (3), with the aid of a detection laser beam, fine tuning the mounting azimuths of an X-axis guide rail, a Y-axis guide rail, and the printer head till the motion levelness of the printer head is adjusted to meet requirements of the design accuracy of the printer; (4), with the aid of the detection laser beam, fine tuning the mounting azimuth of a printing platform till the mounting levelness of the printing platform is adjusted to meet the requirements of the design accuracy of the printer; (5), starting the 3D printing program; (6), in the printing process, detecting in real time whether a nozzle of the printer head generates faults including material blockage, shortage, and breakage. The present invention communicates detection signals of a laser detection system with a printer control system and designs the signal processing program to achieve detection of the motion levelness and the mounting levelness as well as monitoring of extrusion faults of the printer head.

1 Claim, 1 Drawing Sheet

(51) Int. Cl.
  *B29C 64/209* (2017.01)
  *B23K 26/082* (2014.01)
  *B29C 64/232* (2017.01)
  *B29C 64/245* (2017.01)
  *B29C 64/236* (2017.01)
  *B23K 26/06* (2014.01)
  *B33Y 10/00* (2015.01)
  *B33Y 50/02* (2015.01)

(52) U.S. Cl.
  CPC .......... *B23K 26/082* (2015.10); *B29C 64/209* (2017.08); *B29C 64/232* (2017.08); *B29C 64/236* (2017.08); *B29C 64/245* (2017.08); *B29C 64/393* (2017.08); *B33Y 10/00* (2014.12); *B33Y 50/02* (2014.12)

(58) Field of Classification Search
  CPC ....... B29C 64/393; B33Y 10/00; B33Y 50/00; B33Y 50/02; B23K 26/0643; B23K 26/0652
  See application file for complete search history.

(56) References Cited

U.S. PATENT DOCUMENTS

| | | | | |
|---|---|---|---|---|
| 7,499,156 B2* | 3/2009 | Chen | .................... | G01N 21/956 |
| | | | | 356/237.4 |
| 8,035,877 B2* | 10/2011 | Yamazaki | ............ | G02B 26/101 |
| | | | | 359/206.1 |
| 8,441,650 B2* | 5/2013 | Kuriyama | .......... | G01B 9/02081 |
| | | | | 356/512 |
| 10,690,908 B2* | 6/2020 | Kim | ....................... | G02B 26/101 |
| 2020/0139632 A1* | 5/2020 | Schulz | ................. | B23K 26/707 |

* cited by examiner

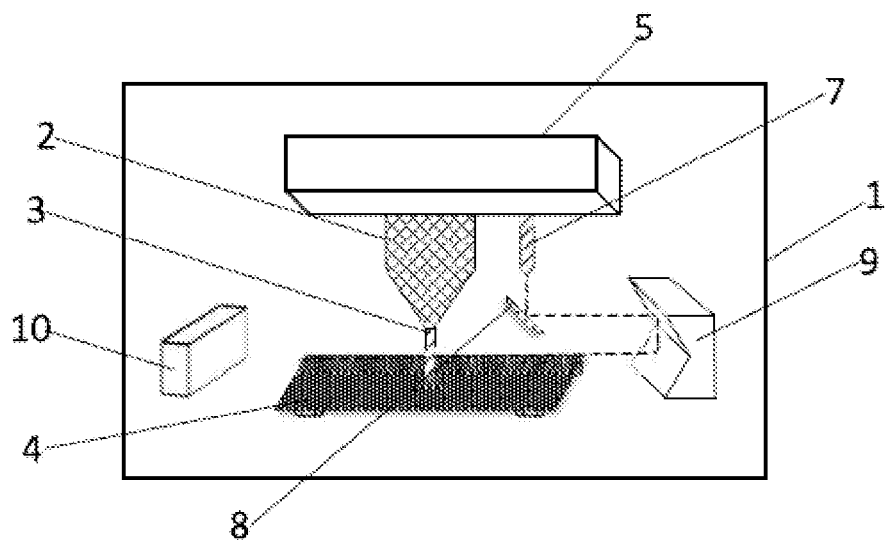

ONLINE LASER LEVELING DETECTION METHOD OF 3D PRINTER

CROSS-REFERENCE TO RELATED APPLICATIONS

The present application claims priority to Chinese Patent Appl. No. 201911130463.9 to Gao et al., filed Nov. 18, 2019, and entitled "Online Laser Leveling Detection Method of 3D Printer", and incorporates its disclosure herein by reference in its entirety.

TECHNICAL FIELD

The present invention belongs to the field of laser 3D printing, and specifically, relates to an online laser leveling detection method of a 3D printer.

BACKGROUND

With the progress and development of technology, 3D printing has developed rapidly in recent years. The output and sales of 3D printers in both international and domestic markets are growing steadily. Compared with the traditional mass production, 3D printing is easier to meet people's individual demands in terms of price and efficiency. 3D printers utilizing the fused deposition modeling (FDM) technology have the highest market share and are widely applied to the industries of education, artistic creativity, medical, etc.

The specific principle of the FDM 3D printer is as follows: filamentous hot-melt materials are heated and melted. At the same time, under the control of the computer, the 3D printer nozzle selectively coats the materials on the workbench according to the section profile information, and forms a layer of section after rapid cooling. After one layer is formed, the workbench of the 3D printer descends to a height (namely, a layered thickness) and then forms the next layer till the whole solid model is formed.

Currently, the existing FDM 3D printer mainly has the following problems: 1, the assembly accuracy of the printer head is low and cannot ensure its horizontal accuracy and kinematic accuracy; 2, the magnetic base sheet mounted on the printing platform is hard to be mounted in place every time, which wastes time in the mounting process; 3, in the model printing process, the specific size of the model cannot be seen intuitively; 4, the printer does not have relative feedback and a warning function when the printer nozzle has faults (such as material breakage, accumulation, and blockage); 5, the printing platform is mainly manually leveled, and its levelness detection is mainly achieved by a sheet plug (which is inserted between the printing platform and the nozzle), which cannot achieve quick and accurate leveling effects.

SUMMARY

Aiming at the defects in the prior art, the present invention proposes an online laser leveling detection method of a 3D printer.

The present invention is achieved by the following technical solution:

An online laser leveling detection method of a 3D printer comprises the following steps:

(1) arranging a bar-shaped triangular reflecting prism and a bar-shaped photoelectric receiver on an FDM 3D printer with a mounted printer head mechanical structure;

wherein the FDM 3D printer with the mounted printer head mechanical structure is as follows: the printer head of the FDM 3D printer is mounted on a sliding table, and the sliding table has an X-axis guide rail and a Y-axis guide rail and can conduct X-axis interpolation motion and Y-axis interpolation motion; a printing platform bearing a printing model only conducts Z-axis lift motion; fused plastic extruded by the printer head is subjected to graphic layer-by-layer deposition through the combined motion of the printer head and the printing platform to form a solid model;

the printer head comprises an extrusion mechanism and a nozzle; the printing platform is square;

the bar-shaped triangular reflecting prism is elongated and has two reflector surfaces; the bar-shaped photoelectric receiver is elongated, the length of a photoelectric signal receiving surface of the bar-shaped photoelectric receiver is not less than the length of the bar-shaped triangular reflecting prism, and the length of the bar-shaped triangular reflecting prism is not less than the maximum side length of the printing platform;

the bar-shaped triangular reflecting prism and the bar-shaped photoelectric receiver are arranged as follows: the bar-shaped triangular reflecting prism and the bar-shaped photoelectric receiver are fixedly mounted in a printer shell; they are respectively mounted on the left side and the right side of the printing platform face to face to ensure that laser beams incident from the same plane just fall on the receiving surface of the bar-shaped photoelectric receiver and form a straight line after reflected twice by the bar-shaped triangular reflecting prism;

(2) fixedly mounting a laser emitter and a plane mirror on the side face of the printer head to ensure that they synchronously move along with the printer head;

wherein the laser emitter is uprightly mounted and is used for outputting a detection laser beam; the plane mirror has an optical adjusting frame and is used for changing the travel direction of the detection laser beam; their mounting azimuths ensure that the detection laser beam is reflected to the horizontal direction by the plane mirror, incomes to the bar-shaped triangular reflecting prism, and then is horizontally emitted to the bar-shaped photoelectric receiver after reflected twice by the bar-shaped triangular reflecting prism;

(3) with the aid of the detection laser beam, continuously fine tuning the mounting azimuths of the X-axis guide rail, the Y-axis guide rail, and the printer head till the motion levelness of the printer head is adjusted to meet requirements of the design accuracy of the printer;

the step is specifically as follows:

(3.1) turning on the laser emitter to emit the laser beam, wherein the laser beam is horizontally emitted to the bar-shaped photoelectric receiver after reflected by the plane mirror and the bar-shaped triangular reflecting prism;

(3.2) by a control system, controlling the printer head to conduct the X-axis interpolation motion and the Y-axis interpolation motion in the travel range; conducting the straight line fit on all signals received by the bar-shaped photoelectric receiver to obtain a fitted straight line; calculating the straight line fit error;

(3.3) if the straight line fit error is in an acceptable fluctuation range of the required design accuracy of the printer, representing that the motion levelness of the printer head meets the design requirements;

if the straight line fit error is out of the allowable fluctuation range of the required design accuracy of the printer, representing that the motion levelness of the printer head does not meet the design requirements; in this case, marking all signals, the straight line fit errors of which exceed the acceptable fluctuation range, wherein the positions of the printer head corresponding to these signals are positions having straightness deviations; controlling the printer head to move to one of the positions having the straightness deviations, and fine tuning the mounting azimuths of the X-axis guide rail, the Y-axis guide rail, and the printer head till the straight line fit errors of signals received by the bar-shaped photoelectric receiver fall within the allowable fluctuation range; in this way, adjusting the positions having the straightness deviations one by one till the straight line fit errors of all signals received by the bar-shaped photoelectric receiver fall within the allowable fluctuation range;

(4) with the aid of the detection laser beam, continuously fine tuning the mounting azimuth of the printing platform till the mounting levelness of the printing platform is adjusted to meet the requirements of the design accuracy of the printer;

the step is specifically as follows:

(4.1) turning on the laser emitter to emit the laser beam, wherein the laser beam is horizontally emitted to the bar-shaped photoelectric receiver after reflected by the plane mirror and the bar-shaped triangular reflecting prism; by the control system, adjusting X-axis, Y-axis, and Z-axis three-dimensional motions to ensure that the printer head is located at one of the four corners of the square printing platform, adjusting an Z-axis position till the printing platform is close to the printer head, and then locking the Z-axis position;

(4.2) adjusting a support post height adjustment nut at the bottom of the corner in order that the printing platform lifts up to block the detection laser beam, that is, the bar-shaped photoelectric receiver cannot receive signals transmitted by the laser emitter; then, screwing back the support post height adjustment nut in order that the printing platform lifts down slowly till the bar-shaped photoelectric receiver just receives the signals transmitted by the laser emitter;

(4.3) by the control system, controlling the X-axis motion and the Y-axis motion of the printer head in order that the printer head is located at another unadjusted corner of the square printing platform; adjusting a support post height adjustment nut at the bottom of the corner in order that the printing platform lifts up to block the detection laser beam, that is, the bar-shaped photoelectric receiver cannot receive the signals transmitted by the laser emitter; then, fine screwing back the support post height adjustment nut in order that the printing platform lifts down slowly till the bar-shaped photoelectric receiver just receives the signals transmitted by the laser emitter;

(4.4) repeatedly conducting step (4.3) till height adjustment of support posts at the four corners of the square printing platform is completed, wherein the mounting levelness of the printing platform is adjusted to meet the requirements of the design accuracy of the printer;

(5) adjusting the position of the printer head to ensure that the nozzle of the printer head is just located at a position having the distance of 1-2 mm above the light path of the horizontal detection laser beam reflected by the bar-shaped triangular reflecting prism and then emitted to the bar-shaped photoelectric receiver; starting the 3D printing program;

(6) in the printing process, detecting in real time whether the nozzle of the printer head generates faults including material blockage, shortage, and breakage, so as to achieve the intelligent and closed-loop controlled extrusion fault monitoring of the printer head;

the step is specifically as follows:

if the nozzle should extrude filaments at some point: when no material breakage fault occurs, the laser emitter emits the laser beam, the extruded filaments may block the laser beam, and then the bar-shaped photoelectric receiver cannot receive the signal; however, if the bar-shaped photoelectric receiver receives the signal, it represents that the material breakage fault occurs;

if the nozzle should not extrude the filaments at some point: when the material blockage fault occurs, the laser emitter emits the laser beam, the filaments blocked below the nozzle may block the laser beam, and then the bar-shaped photoelectric receiver cannot receive the signal; however, if the bar-shaped photoelectric receiver receives the signal, it represents that no material blockage fault occurs;

(7) completing the 3D printing program and obtaining a printed solid model.

The present invention has the following beneficial effects:

Currently, the typical FDM 3D printer has the mounted printer head mechanical structure. Specifically, the printer head is mounted on the sliding table, and the sliding table can conduct the X-axis interpolation motion and the Y-axis interpolation motion. The printing platform bearing the printing model only conducts the Z-axis lift motion. The fused plastic extruded by the printer head is subjected to the graphic layer-by-layer deposition through the combined motion of the printer head and the printing platform to form the solid model.

1. The online laser leveling detection method of a 3D printer of the present invention aims at the FDM 3D printer with the mounted printer head mechanical structure. The laser detection system can be utilized to detect the levelness of X and Y plane motions of the printer head in any place in the range of the printing platform (because the printer head is driven by the X-axis interpolation motion and the Y-axis interpolation motion, the motion levelness essentially is the mounting levelness and the straightness of the X-axis guide rail and the Y-axis guide rail). Therefore, according to the specific embodiments of the present invention, it can be achieved: under the instruction of the laser detection system, the mounting azimuths of the X-axis guide rail, the Y-axis guide rail, and the printer head are continuously fine-tuned till the motion levelness of the printer head is adjusted to the higher accuracy, thereby solving the defect that such printer currently cannot adjust the motion levelness of the X-axis guide rail, the Y-axis guide rail, and the printer head according to the feedback because lack of effective detection methods and devices.

2. The online laser leveling detection method of a 3D printer of the present invention aims at the FDM 3D printer with the mounted printer head mechanical structure. The laser detection system can be utilized to detect the mounting levelness of the printing platform. So, it can be achieved: under the instruction of the laser detection system, the heights of the four support posts of the printing platform are continuously and sequentially fine tuned till the levelness of the printing platform is adjusted to the higher accuracy, thereby solving the defect that such printer currently can only be detected by a sheet plug because lack of effective detection methods and devices. The adjustment is simple, quick, and highly accurate. The detection signal and a support post height adjustment motor are communicated; so, full-automatic leveling of the printing platform can be achieved by the special leveling control program.

3. The online laser leveling detection method of a 3D printer of the present invention aims at the FDM 3D printer with the mounted printer head mechanical structure. The laser detection system can be utilized to detect in real time whether the printer head generates material blockage and breakage faults. The detection signals of the laser detection system are communicated with the printer control system, and the signal processing program is designed; so, the intelligent and closed-loop controlled extrusion fault monitoring of the printer head can be achieved.

BRIEF DESCRIPTION OF THE DRAWINGS

FIG. 1 is a schematic structural diagram of an online laser leveling detection method of a 3D printer of the present invention.

FIG. 2 is a flow diagram illustrating an exemplary an online laser leveling detection method of a 3D printer, according to some implementations of the current subject matter.

DETAILED DESCRIPTION

The present invention will be further described in detail with reference to the accompanying drawings and specific embodiments.

As shown in FIG. 2, an online laser leveling detection method 200 of a 3D printer proposed by the present invention comprises the following steps:

(1) arranging a bar-shaped triangular reflecting prism 9 and a bar-shaped photoelectric receiver 10 on a fused deposition modeling (FDM) 3D printer with a mounted printer head mechanical structure (at 202);

wherein the FDM 3D printer with the mounted printer head mechanical structure is as follows: the printer head of the FDM 3D printer is mounted on a sliding table 5, and the sliding table has an X-axis guide rail and a Y-axis guide rail and can conduct X-axis interpolation motion and Y-axis interpolation motion; a printing platform 4 bearing a printing model only conducts Z-axis lift motion; fused plastic extruded by the printer head is subjected to graphic layer-by-layer deposition through the combined motion of the printer head and the printing platform 4 to form a solid model; the printer head comprises an extrusion mechanism 2 and a nozzle 3; the printing platform 4 is square;

the bar-shaped triangular reflecting prism 9 is elongated and has two reflector surfaces; the bar-shaped photoelectric receiver 10 is elongated, the length of a photoelectric signal receiving surface of the bar-shaped photoelectric receiver is not less than the length of the bar-shaped triangular reflecting prism 9, and the length of the bar-shaped triangular reflecting prism 9 is not less than the maximum side length of the printing platform;

the bar-shaped triangular reflecting prism 9 and the bar-shaped photoelectric receiver 10 are arranged as follows: the bar-shaped triangular reflecting prism 9 and the bar-shaped photoelectric receiver 10 are fixedly mounted in a printer shell 1; they are respectively mounted on the left side and the right side of the printing platform face to face to ensure that laser beams incident from the same plane just fall on the receiving surface of the bar-shaped photoelectric receiver 10 and form a straight line (that is, the orthographic projection of the plane is a straight line) after reflected twice by the bar-shaped triangular reflecting prism 9; in the mounting process, their mounting azimuths are adjusted by utilizing auxiliary tools such as a level, etc.

(2) fixedly mounting a laser emitter 7 and a plane mirror 8 on the side face of the printer head (they can synchronously move along with the printer head) (at 204);

wherein the laser emitter 7 is uprightly mounted (namely, in parallel with the extrusion direction of the nozzle of the printer head) and is used for outputting a detection laser beam; the plane mirror 8 has an optical adjusting frame and is used for changing the travel direction of the detection laser beam; their mounting azimuths ensure that the detection laser beam is reflected to the horizontal direction by the plane mirror, incomes to the bar-shaped triangular reflecting prism 9, and then is horizontally emitted to the bar-shaped photoelectric receiver 10 after reflected twice by the bar-shaped triangular reflecting prism 9;

(3) with the aid of the detection laser beam, continuously fine tuning the mounting azimuths of the X-axis guide rail, the Y-axis guide rail, and the printer head till the motion levelness of the printer head is adjusted to meet requirements of the design accuracy of the printer (at 206);

the step is specifically as follows:

(3.1) turning on the laser emitter 7 to emit the laser beam, wherein the laser beam is horizontally emitted to the bar-shaped photoelectric receiver 10 after reflected by the plane mirror 8 and the bar-shaped triangular reflecting prism 9;

(3.2) by a control system, controlling the printer head to conduct the X-axis interpolation motion and the Y-axis interpolation motion in the travel range; conducting the straight line fit on all signals received by the bar-shaped photoelectric receiver 10 to obtain a fitted straight line; calculating the straight line fit error;

(3.3) if the straight line fit error is in an acceptable fluctuation range of the required design accuracy of the printer, representing that the motion levelness of the printer head meets the design requirements;

if the straight line fit error is out of the allowable fluctuation range of the required design accuracy of the printer, representing that the motion levelness of the printer head does not meet the design requirements; in this case, marking all signals, the straight line fit errors of which exceed the acceptable fluctuation range, wherein the positions of the printer head corresponding to these signals are positions having straightness deviations; controlling the printer head to move to one of the positions having the straightness deviations, and fine tuning the mounting azimuths of the X-axis guide rail, the Y-axis guide rail, and the printer head till the straight line fit errors of signals received by the bar-shaped photoelectric receiver 10 fall within the allowable fluctuation range; in this way, adjusting the positions having the straightness deviations one by one till the straight line fit errors of all signals received by the bar-shaped photoelectric receiver 10 fall within the allowable fluctuation range;

(4) with the aid of the detection laser beam, continuously fine tuning the mounting azimuth of the printing platform till the mounting levelness of the printing platform is adjusted to meet the requirements of the design accuracy of the printer (at 208);

the step is specifically as follows:

(4.1) turning on the laser emitter 7 to emit the laser beam, wherein the laser beam is horizontally emitted to the bar-shaped photoelectric receiver 10 after reflected by the plane mirror 8 and the bar-shaped triangular reflecting prism 9; by the control system, adjusting X-axis, Y-axis, and Z-axis three-dimensional motions to ensure that the printer head is located at one of the four corners of the square printing platform, adjusting an Z-axis position till the printing platform 4 is close to the printer head (their distance is less than 3 mm), and then locking the Z-axis position;

(4.2) adjusting a support post height adjustment nut at the bottom of the corner in order that the printing platform 4 lifts up to block the detection laser beam, that is, the bar-shaped photoelectric receiver 10 cannot receive signals transmitted by the laser emitter 7; then, screwing back the support post height adjustment nut in order that the printing platform 4 lifts down slowly till the bar-shaped photoelectric receiver 10 just receives the signals transmitted by the laser emitter 7;

(4.3) by the control system, controlling the X-axis motion and the Y-axis motion of the printer head in order that the printer head is located at another unadjusted corner of the square printing platform; adjusting a support post height adjustment nut at the bottom of the corner in order that the printing platform 4 lifts up to block the detection laser beam, that is, the bar-shaped photoelectric receiver 10 cannot receive the signals transmitted by the laser emitter 7; then, fine screwing back the support post height adjustment nut in order that the printing platform 4 lifts down slowly till the bar-shaped photoelectric receiver 10 just receives the signals transmitted by the laser emitter 7;

(4.4) repeatedly conducting step (4.3) till height adjustment of support posts at the four corners of the square printing platform is completed, wherein the mounting levelness of the printing platform is adjusted to meet the requirements of the design accuracy of the printer;

it should be noted that the above step (4.1) to step (4.4) can be adjusted manually, that is, the bar-shaped photoelectric receiver 10 and a support post height adjustment motor are linked, and full-automatic leveling of the printing platform is achieved by the special leveling control program;

(5) because the printer head and the printing platform are adjusted after step (3) and step (4), starting the 3D printing program according to the conventional process (at 210);

(6) in the printing process, detecting in real time whether the nozzle of the printer head generates faults including material blockage, shortage, and breakage, so as to achieve the intelligent and closed-loop controlled extrusion fault monitoring of the printer head (at 212);

Specifically, detection signals of a laser detection system is communicated with the printer control system, and a signal processing program is designed. The nozzle 3 of the printer head is ensured to be just located at a position having the distance of 1-2 mm above the light path of the horizontal detection laser beam reflected by the bar-shaped triangular reflecting prism 9 and then emitted to the bar-shaped photoelectric receiver 10. When the printing starts, if the nozzle 3 should extrude filaments at some point: when no material breakage fault occurs, the laser emitter 7 emits the laser beam, the extruded filaments may block the laser beam, and then the bar-shaped photoelectric receiver 10 cannot receive the signal; however, if the bar-shaped photoelectric receiver 10 receives the signal, it represents that the material breakage fault occurs; if the nozzle 3 should not extrude the filaments at some point (in a deadhead state): when the material blockage fault occurs, the laser emitter 7 emits the laser beam, the filaments blocked below the nozzle may block the laser beam, and then the bar-shaped photoelectric receiver 10 cannot receive the signal; however, if the bar-shaped photoelectric receiver 10 receives the signal, it represents that no material blockage fault occurs;

(7) completing the 3D printing program and obtaining a printed solid model.

Various changes to the present invention are apparent to those skilled in the art and should not be considered to depart from the scope of the present invention. All modifications apparent to those skilled in the art should fall within the scope of the appended claims.

What is claimed is:

1. An online laser leveling detection method of a 3D printer, the method comprising:
arranging a bar-shaped triangular reflecting prism and a bar-shaped photoelectric receiver on a fused deposition modeling (FDM) 3D printer with a mounted printer head mechanical structure;
wherein the FDM 3D printer with the mounted printer head mechanical structure is provided as follows: the printer head of the FDM 3D printer is mounted on a sliding table, and the sliding table has an X-axis guide rail and a Y-axis guide rail and can conduct X-axis interpolation motion and Y-axis interpolation motion; a printing platform of the printer is configured to bear a printed model and conduct Z-axis lift motion; and fused plastic extruded by the printer head is subjected to graphic layer-by-layer deposition through combined motion of the printer head and the printing platform to form a solid model;
wherein the printer head comprises an extrusion mechanism and a nozzle configured to extrude filaments, and the printing platform is square;
wherein the bar-shaped triangular reflecting prism is elongated and has two reflector surfaces, the bar-shaped photoelectric receiver is elongated, the length of a photoelectric signal receiving surface of the bar-shaped photoelectric receiver is not less than the length of the bar-shaped triangular reflecting prism, and the length of the bar-shaped triangular reflecting prism is not less than a maximum corresponding side length of the printing platform;
wherein the bar-shaped triangular reflecting prism and the bar-shaped photoelectric receiver are arranged as follows: the bar-shaped triangular reflecting prism and the bar-shaped photoelectric receiver are fixedly mounted in a printer shell and are respectively mounted on left and right sides of the printing platform face to face to ensure that laser beams incident from the same plane fall on the receiving surface of the bar-shaped photoelectric receiver along a straight line after being reflected twice by the bar-shaped triangular reflecting prism;
fixedly mounting a laser emitter and a plane mirror on a side face of the printer head so as to synchronously move along with the printer head;
wherein the laser emitter is uprightly mounted and outputs a detection laser beam, the plane mirror has an optical adjusting frame and changes the travel direction of the detection laser beam, and mounting azimuths of the laser emitter and the plane mirror cause the detection laser beam to be sequentially reflected horizontally by the plane mirror, income to the bar-shaped triangular reflecting prism, and then be horizontally emitted to the bar-shaped photoelectric receiver after reflected twice by the bar-shaped triangular reflecting prism;
continuously fine tuning, using the detection laser beam, mounting azimuths of the X-axis guide rail, the Y-axis guide rail, and the printer head so that motion levelness of the printer head is adjusted to meet design accuracy requirements of the printer for the solid model being formed, wherein the continuously fine tuning the mounting azimuths of the X-axis guide rail, the Y-axis guide rail, and the printer head includes:
turning on the laser emitter to emit the laser beam, wherein the laser beam is horizontally emitted to the bar-shaped photoelectric receiver after said reflections by the plane mirror and the bar-shaped triangular reflecting prism;

controlling, using a control system, the printer head to conduct X-axis interpolation motion and the Y-axis interpolation motion;

conducting a straight line fit on all laser beam signals received by the bar-shaped photoelectric receiver to obtain a fitted straight line; and calculating a straight line fit error, wherein if the straight line fit error is in an acceptable fluctuation range of the required design accuracy of the printer, a representation is provided that the motion levelness of the printer head meets the design requirements, and wherein if the straight line fit error is out of the allowable fluctuation range of the required design accuracy of the printer, a representation is provided that the motion levelness of the printer head does not meet the design requirements, in which case all of the beam signals the straight line fit errors of which exceed the acceptable fluctuation range are marked, wherein positions of the printer head corresponding to the marked signals correspond to positions having straightness deviations, and wherein the printer head is controlled to move to each of the positions having the straightness deviations, and fine tuning is performed on the mounting azimuths of the X-axis guide rail, the Y-axis guide rail, and the printer head until the straight line fit errors of the marked signals fall within the allowable fluctuation range, thereby adjusting the positions having the straightness deviations one by one until the straight line fit errors of all of the marked signals fall within the allowable fluctuation range;

continuously fine tuning, using the detection laser beam, a mounting azimuth of the printing platform so that mounting levelness of the printing platform is adjusted to meet the requirements of the design accuracy of the printer, wherein the continuously fine tuning the mounting azimuth of the printing platform includes:

turning on the laser emitter to emit the laser beam, wherein the laser beam is horizontally emitted to the bar-shaped photoelectric receiver after said reflections by the plane mirror and the bar-shaped triangular reflecting prism;

by the control system, adjusting X-axis, Y-axis, and Z-axis three-dimensional motions of the printer head so that the printer head is located at one of the four corners of the square printing platform, adjusting a Z-axis position of the printing platform so as to be close to the printer head, and then locking the close Z-axis position;

adjusting a support post height adjustment nut arranged at the bottom of the one corner such that the printing platform lifts up to block the detection laser beam from being received by the bar-shaped photoelectric receiver, and then screwing back the support post height adjustment nut of the one corner such that the printing platform lowers down slowly until immediately after the bar-shaped photoelectric receiver receives the detection beam;

controlling, using the control system, X-axis motion and Y-axis motion of the printer head such that the printer head is located at another corner of the square printing platform, adjusting a support post height adjustment nut at the bottom of the other corner such that the printing platform lifts up to block the detection laser beam from being received by the bar-shaped photoelectric receiver, and then fine screwing back the support post height adjustment nut of the other corner such that the printing platform lowers down slowly until immediately after the bar-shaped photoelectric receiver receives the detection beam; and conducting height adjustment of support post adjustment nuts respectively arranged at the remaining two of the four corners of the square printing platform so that mounting levelness of the printing platform is adjusted to meet the requirements of the design accuracy of the printer;

adjusting the position of the printer head so that the nozzle of the printer head is located at a position having a distance of 1-2 mm above a light path of the horizontal detection laser beam reflected by the bar-shaped triangular reflecting prism to the bar-shaped photoelectric receiver;

starting a 3D printing program for forming the solid model;

detecting, during the printing and in real time whether the nozzle of the printer head generates faults including at least one of a material blockage, a shortage, and a breakage, according to a closed-loop controlled extrusion fault monitoring of the printer head configured such that:

filaments being extruded by the nozzle are configured to block the detection laser beam from being received by the bar-shaped photoelectric receiver such that one of said faults is detected to occur if the bar-shaped photoelectric receiver receives the detection laser beam during said extruding; and receipt of the detection laser beam by the bar-shaped photoelectric receiver after one of said faults is detected to occur represents that no material blockage fault exists; and completing the 3D printing program to obtain the solid model.

* * * * *